United States Patent [19]

Schaefer

[11] 3,981,743
[45] Sept. 21, 1976

[54] METHOD OF PREPARING A LITHIUM-ALUMINUM ELECTRODE

[75] Inventor: James Clement Schaefer, N. Royalton Cuyahoga, Ohio

[73] Assignee: ESB Incorporated, Philadelphia, Pa.

[22] Filed: June 6, 1975

[21] Appl. No.: 584,629

[52] U.S. Cl. ............................... 429/218; 29/623.1; 429/209
[51] Int. Cl.² ................... H01M 35/18; H01M 4/26
[58] Field of Search ............. 136/75, 100 R, 20, 83, 136/120 R; 75/134, 138

[56] References Cited
UNITED STATES PATENTS

| | | |
|---|---|---|
| 3,428,493 | 2/1969 | Adams .......................... 136/100 R |
| 3,462,312 | 8/1969 | Rightmire et al. .............. 136/100 R |
| 3,751,298 | 8/1973 | Senderoff ......................... 136/6 F |

*Primary Examiner*—Anthony Skapars
*Attorney, Agent, or Firm*—Anthony J. Rossi

[57] ABSTRACT

A lithium-aluminum negative electrode for an electrochemical cell is prepared by forming a sandwich comprised of lithium and aluminum such that lithium is disposed between the aluminum layers of the sandwich. The sandwich is heat soaked at a temperature below the melting point of lithium while pressure is applied to the sandwich thereby causing the lithium and aluminum to chemically react to form a lithium-aluminum alloy.

6 Claims, 3 Drawing Figures

METHOD OF PREPARING A LITHIUM-ALUMINUM ELECTRODE

The invention herein described was made in the course or under a contract or subcontract thereunder with the Department of the Army.

BACKGROUND OF THE INVENTION

1. Field of the Invention:

This invention relates to methods for preparing negative electrodes or anodes for use in electrical energy storage devices or batteries. More particularly, it relates to methods for preparing lithium-aluminum negative electrodes for use in such devices or batteries.

2. Description of the Prior Art:

It may be explained here that high power delivery and rapid charge, and discharge above the range of a conventional lead-acid storage battery can be obtained from a high temperature electrical energy storage battery of cell comprising a pair of electrodes, at least one of which is a negative electrode comprised of lithium and aluminum, the electrode being emersed or in contact with a fused alkali halide electrolyte. The fast charging characteristics of such a cell are mainly attributable to the highly reversible lithium-aluminum negative electrode of the cell. The positive electrode of such a cell can be carbon or any other suitable material.

The prior art methods for producing the lithium-aluminum negative electrode have been primarily either electrochemical or metallurgical.

In the electrochemical method, lithium-aluminum electrodes were produced by electrochemically charging a substantially pure aluminum electrode in an electrolyte containing lithium halide salt or salts. This electrochemical method was essentially effected by immersing a positive electrode, such as carbon, and a negative electrode, the aluminum electrode, into a molten lithium containing electrolyte and impressing an appropriate voltage across the two electrodes. Lithium in the electrolyte would diffuse into the aluminum electrode structure to form the desired lithium-aluminum electrode.

In the metallurgical method, lithium-aluminum electrodes were produced by melting a mixture containing a predetermined amount of each metal to form an alloy of lithium-aluminum.

One of the difficulties associated with the above described electrochemical method of preparing lithium-aluminum electrodes is that after they have been electrolytically formed, it is necessary to precondition the electrodes by initially operating them through a number of time consuming cycles of slow charge and discharge. If the initial cycles are carried out too quickly, regions of liquid metal alloy can be produced resulting in pitting of the electrode. Another difficulty presented in the use of electrochemically prepared lithium-aluminum electrodes is their lack of dimensional stability due to the fact that during the forming and preconditioning steps, they have been found to sometimes expand.

The preparation of lithium-aluminum electrodes by metallurgical techniques has also presented problems in that it has been difficult in the past to obtain lithium-aluminum alloys with compositions much in excess of 5 weight percent lithium with acceptable purity levels and lack of fragility. Due to this less than desirable percentage of lithium, it was necessary to place the 5 weight percent lithium-aluminum electrodes in a molten salt formation tank and electrolytically "pump-up" the electrode with lithium from the electrolyte, to lithium percentages of at least about 12%, with the preferred range being about 6 to 25 weight percent lithium. Manufacturers of lithium alloys have attempted to fabricate lithium-aluminum electrodes having the preferred range of weight percent lithium by melting the components together in low humidity, dry, and argon atmospheres, and then pouring the molten liquid into molds, but they have not been entirely successful for the reasons that the handling of such a molten liquid is extremely hazardous and unusually in an inert atmosphere. At the elevated temperatures required to melt the components, the lithium acts as a getter for oxygen, nitrogen and water vapor. The resulting alloy by these procedures is generally brittle, contaminated and in the form of thick slabs that are difficult and literally impossible to utilize for battery manufacture.

Another problem associated with metallurgically prepared lithium-aluminum electrodes is that of providing low impurity levels while casting, and after crushing, remelting of the metals or compacting the powder by powder metallurgical methods to form the lithium-aluminum alloy. High inpurity levels in the lithium-aluminum alloy required that the fabricated electrodes be cleaned by electrolytic methods similar to those described above for the preparation of electrodes by electrolytic methods.

Therefore, in view of the above, it is a primary object of the present invention to provide a method of preparing negative electrodes comprised of a lithium-aluminum alloy relatively free of impurities for use in high-temperature electrochemical cells.

Another object of the present invention is to provide a method of preparing solid lithium-aluminum electrodes comprised of from about 6 to 25 weight percent, based on total composition, lithium without employing lengthy electrochemical processes or the necessity of handling or working with molten metals as in the case of prior art metallurgical methods of preparing such electrodes.

Still another object of the present invention, is to provide essentially uniform and dimensionally stable electrodes comprised of lithium in amounts of from about 6 to 25 weight percent, based on total composition, and from about 75 to 94 weight percent, based on total composition, aluminum.

The foregoing and other objects and features of the invention will be evident from the following detailed description thereof.

SUMMARY OF THE INVENTION

In the broadest aspect of this invention, the method for preparing the lithium-aluminum electrode comprises forming a sandwich comprised of sheets of lithium and aluminum such that the lithium is disposed between the aluminum layers of the sandwich. The thus formed sandwich is then heat soaked while simultaneously applying pressure to the sandwich to assure contact between abuting surfaces of lithium and aluminum sheets making up the sandwich thereby causing the lithium and aluminum to chemically react to form a lithium-aluminum alloy.

A more complete understanding of the invention will be had from the following detailed description taken in conjunction with the accompanying drawings which form a part of this specification.

DETAILED DESCRIPTION OF THE PREFERRED EMBODIMENT

Before explaining the present invention in detail, it is to be understood that the invention is not limited in its application to the particular construction and arrangements of parts illustrated in the accompanying drawings, since the invention is capable of other embodiments and of being practiced and carried on in various ways. Also, it is to be understood that the phraseology or terminology employed herein as well as the example given hereinafter is for the purpose of description and not of limitation.

Figure 1:
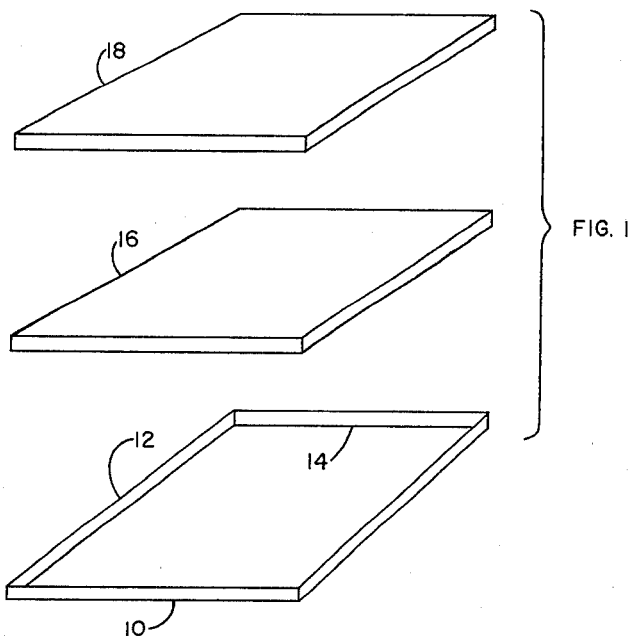
FIG. 1 is a diagrammatic exploded view of a lithium-aluminum electrode in the process of fabrication in accordance with the method of the invention.
Figure 2:
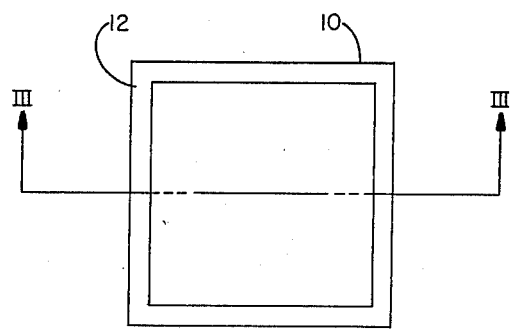
FIG. 2 is a diagrammatic assembled view of a lithium-aluminum electrode in the process of fabrication in accordance with the method of the invention.
Figure 3:
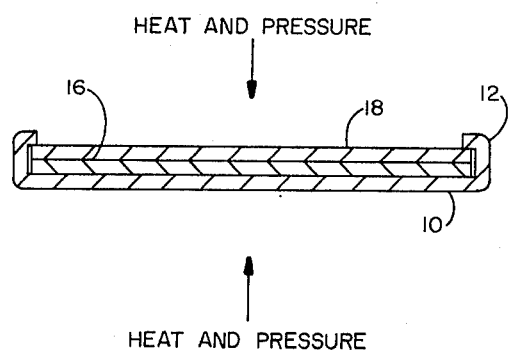
FIG. 3 is a view taken along the line III–III of FIG. 2.

This invention will be further understood by reference to the drawings wherein diagrammatic views illustrating the method in accordance with the invention are shown in FIGS. 1–3.

In FIG. 1, 10 generally represents a thin sheet of substantially pure aluminum. The peripheral edges 12 of the sheet 10 are turned upwardly along fold-lines 14 to, in effect, form an open topped, shallow rectangular box. Illustrated above the rectangular box is a thin sheet or ribbon 16 of substantially pure lithium. The lithium sheet 16 is preferably sized to fit substantially exactly within the fold-lines 14. Positioned above the lithium sheet 16 is another sheet of aluminum 18 which is also sized to fit substantially exactly within the fold-lines 14.

In accordance with the invention, the lithium sheet 16 is placed within the rectangular box formed by the aluminum sheet 10 and the aluminum sheet 18 is placed on top of the lithium sheet 16 thereby forming a sandwich comprised of aluminum-lithium-aluminum as is best illustrated in FIG. 3. Thereafter, the peripheral edge 12 of aluminum sheet 10 are folded over on to the peripheral edges of the aluminum sheet 18 thereby enveloping the lithium sheet 16.

It should be pointed out here that the sandwich just described is merely exemplary of various ways of actually forming the sandwich. The sandwich may, for example, be formed multiple layers of three or more coplanar sheets of lithium and aluminum in various configurations, e.g. square, circular, etc., or from one continuous sheet of aluminum folded in half or on itself multiple times with a lithium sheet or sheets being disposed between the folds of the aluminum sheet. Thus, a multilayered sandwich is envisioned comprised of lithium and aluminum with lithium being disposed between the aluminum layers of the sandwich. Of course, combinations of these examples are possible and other ways of forming the sandwich will be obvious to those skilled in the art.

In the just given examples, the dimensions of the aluminum sheet or sheets may be, if desired, sized so as to allow the peripheral edges thereof to be folded over to enclose all or some of the peripheral edges of the lithium sheet or sheets. Also, it is not required that the lithium sheet or sheets be coextensive in their surface areas with those of the aluminum sheet or sheets surface areas within which or between which they are disposed. All that is required is that a layered sandwich of lithium and aluminum be formed such that lithium is disposed between the aluminum layers of the sandwich with the required amounts of each material being present to form the desired alloy composition for the electrode to be fabricated.

After the sandwich is fabricated, sufficient heat and pressure for appropriate lengths of time are applied to the sandwich in order to permit the lithium sheet 16 to alloy with the aluminum sheets 10 and 18.

The order in which the manulative steps of the method of the invention are carried out is not to be considered limiting. Furthermore, except for an aspect of the invention described below in Example VI, it is preferred that the steps of the method be carried out in an inert atmosphere, e.g., argon, helium or other rare gases.

The uniform formation of the desired lithium-aluminum electrode by the novel method of the invention depends on an initial close contact between the lithium and aluminum sheets of the sandwich. To insure a high degree of contact between the abuting faces of the lithium-aluminum sheets of the sandwich, the sandwich can be placed in a press during the alloy formation. Also, while the desired alloy will form by the mere contact of the sheets of lithium and aluminum, the application of heat to the sandwich during alloy formation will increase the speed of the reaction.

It should be pointed out here that during experiments in carrying out the method of the invention, variations existed from sample to sample with respect to alloy completion, and also, that the peripheral edges 12 of the aluminum sheet 10 are not in direct contact with the lithium sheet 16 resulting in non-completion of the alloy along the edges of the sandwich. These results do not, however, prevent the use of electrodes formed by the method of the invention as anodes in cells since after a few cycles of charge and discharge of the cell in which they are utilized the non-alloyed aluminum will be alloyed with lithium contained in the molten salt bath. This could also be so in the case in which the surface dimensions of the lithium sheet are not coextensive with the dimensions of the surfaces of the aluminum sheets between which it is sandwiched.

A better understanding of the present invention can be obtained from the following examples.

EXAMPLE I

In a glove box having an argon atmosphere, a sandwich of aluminum-lithium-aluminum was prepared such that the total percentage of lithium in the sandwich was equivalent to about 12–18 weight percent, based on total composition. The sandwich constructed was of the type illustrated in FIGS. 1–3. The sandwich was placed between the heatable plattens of a small Burton Press and heat and pressure were applied to the sandwich. The sandwich was heat soaked at a temperature below, close to, but not equal to the melting point of lithium (179°C.). Sufficient pressure was applied to assure contact between the abuting faces of the sandwich. It may be pointed out here that the amount of pressure applied to the sandwich is not critical other than it should be enough to assure contact. In this example, the pressure applied was approximately 30 psi. The time of heat soaking was sufficient for the lithium to alloy with the aluminum. Of course, the time of heat soaking will vary with the thickness of the layers of the sandwich. In this particular example, the aluminum sheets were about 32 mils thick and the lithium about 40 mils thick and it required about 175°C. for approximately 8 hours. Upon cooling the thus formed lithium-aluminum electrode was assembled into a cell of the type here contemplated.

EXAMPLE II

In a glove box having an argon atmosphere, an aluminum-lithium-aluminum sandwich was fabricated in accordance with the type illustrated in FIGS. 1–3. The lithium in the sandwich was equivalent to about 17.4 weight percent, based on total composition and the sandwich was approximately 4 in. by 4 in. The sandwich was placed in a room temperature furnace and the temperature was gradually raised to approximately 450°C. which took about 20 minutes. Thereafter, the sandwich was cooled and examined. Examination showed that there was no uniformity in alloy formation, the sandwich was badly misshapened and unusable as a cell electrode. It is believed that these results were effected because there was no containment of the sandwich other than the sandwich package itself and because the 450°C. temperature was above the melting point of the lithium contained in the sandwich.

EXAMPLE III

An alloy sandwich was prepared as in Example II with a lithium content equivalent to about 16.4 weight percent, based on total composition. The sandwich was placed between the heatable plattens of a press. The pressure applied was approximately 80 psi and the temperature of the plattens was raised to about 289°C. Lithium melted and spurted out of the sandwich at the edges thereof. Some alloy formed but was only about 6.4% lithium. The lithium that escaped vigorously attacked the press plattens. Again, the temperature utilized in this example was above the melting point of lithium.

EXAMPLE IV

An alloy sandwich was prepared as in Example II with a lithium content equivalent to about 15.8 weight percent, based on total composition. The sandwich was placed between the heatable plattens of a press. The pressure applied was 30 psi. The temperature of the plattens was gradually raised from room temperature. A fast reaction was noted at about 149°C. At this point, the electric power to plattens was removed and the temperature of the plattens was monitored. The temperature rose to about 208°C. due to the exothermic nature of the reaction. After cooling, examination of the sandwich showed substantially complete alloying and no loss of lithium. The electrode was usable as a cell electrode.

EXAMPLE V

This example involves two sandwiches fabricated as in Example II, which, also in an argon atmosphere, were placed in a steel cell container together with a separator and carbon cathode in a mock-up of a battery cell without a top or electric current collectors. Each anode was about 15.9% lithium by weight. The entire assembly was placed between press plattens at room temperature and approximately 13 psi of pressure were applied to the assembly. The actual pressure applied to the anode sandwiches was unknown, but all components were tightly pressed into the cell's steel container and thereby formed a holder or container for the anode sandwiches. The plattens were heated for approximately 6 minutes and the platten temperature reached approximately 176°C. At this point, electric power to the plattens was removed. The temperature had not reached the melting point of lithium, 179°C., and component temperature naturally lagged and could not exceed 176°C. A reaction was noted 7 minutes later and platten temperature rose to about 187°C. for about 1 minute and then gradually rose to a peak temperature of about 225°C. After cooling and disassembly, examination showed that both anodes were well formed. No attack of molten lithium on adjacent components was noted nor were there any beads of free unreacted lithium present.

EXAMPLE VI

A complete cell was fabricated in an argon atmosphere and was sealed completely, leak checked and was removed to a normal room atmosphere. The anodes were fabricated as in Example II with a lithium content of about 8% by weight. The cell was placed in an oven at room temperature with a set point of about 170°C. The temperature at the cell's surface was monitored as the oven warmed. It took about 105 minutes for the 170°C. set point of the oven to be reached. A reaction was apparent at about 153°C. and the temperature rose to 176°C. although heat was turned off at 153°C. The cell was cooled and then placed in a furnace set-up to cycle cells through charge and discharge cycles. The cell was cycled for 13 cycles, found to perform adequately and to reach a rating of 10 ampere hours.

These examples, among other things, illustrate the alternatives of forming the aluminum-lithium alloy in accordance with the invention in argon or inert gas atmospheres if only anodes are desired or causing the formation of such alloys in the cell container, in situ, in the ambient atmosphere, if desired.

Electrodes or anodes fabricated by the method of the invention afford the lowest possible contamination by oxides, nitrides, carbonates, etc. since the lithium sheets can be the purest state of lithium, and the aluminum sheets can be virgin, electrical grade, aluminum of 99.5 minimum percent aluminum. Initial low contamination is not the only advantage for method of the invention. Cost of manufacture of lithium-aluminum electrodes is drastically reduced since the extra costs of grinding, casting etc., normally attendant with metallurgical processes for forming lithium-aluminum electrodes are eliminated. The simplicity of sandwich making, and unattended heat soaking of the sandwich further reduces costs by avoiding the, only partially successful, anode cleaning procedures required of prior art lithium-aluminum anodes prepared by the metallurgical processes of melting and casting the alloy constituents.

Having thus described my invention, I claim:

1. The method for preparing a negative lithium-aluminum electrode comprising the steps of:
   a. forming a sandwich comprised of sheets of lithium and aluminum such that lithium is disposed between the aluminum layers of the sandwich; and
   b. heat soaking the sandwich of step (a) at a temperature below the melting point of lithium while simultaneously applying pressure to the sandwich to assure contact between the abuting surfaces of lithium and aluminum sheets making up the sandwich of step (a) thereby causing the lithium and aluminum to chemically react to form a lithium-aluminum alloy.

2. A method in accordance with Claim 1 wherein the sandwich of step (a) is placed in a cell container and step (b) is effected while the sandwich of step (a) is in the cell container.

3. The method of Claim 1 wherein the sandwich of step (a) is comprised of a pair of sheets of aluminum having a sheet of lithium disposed therebetween.

4. The method of claim 2 wherein the pair of sheets of aluminum are rectangular in shape and one of the sheets of the pair is sized larger in its peripheral dimensions in order that the peripheral edges thereof may be folded over onto the face of the other aluminum sheet thereby enveloping the lithium contained in the sandwich of step (a).

5. The method of claim 1 wherein the lithium-aluminum alloy formed is comprised of lithium in amounts of from about 6 to 25 weight percent, based on total composition, and from about 75 to 94 weight percent, based on total composition, aluminum.

6. A negative electrode produced in accordance with the method of claim 1.

* * * * *